US010994476B2

(12) United States Patent
Vaccari

(10) Patent No.: US 10,994,476 B2
(45) Date of Patent: May 4, 2021

(54) PROCESS FOR THE REALIZATION OF A WINDOW/DOOR FRAMEWORK FOR WALLS OF BUILDINGS

(71) Applicant: Graf Synergy S.r.l., Nonantola (IT)

(72) Inventor: Andrea Vaccari, Nonantola (IT)

(73) Assignee: Graf Synergy S.r.l., Nonantola (IT)

( * ) Notice: Subject to any disclaimer, the term of this patent is extended or adjusted under 35 U.S.C. 154(b) by 245 days.

(21) Appl. No.: 16/096,293

(22) PCT Filed: May 9, 2017

(86) PCT No.: PCT/IB2017/052698
§ 371 (c)(1),
(2) Date: Oct. 25, 2018

(87) PCT Pub. No.: WO2017/195110
PCT Pub. Date: Nov. 16, 2017

(65) Prior Publication Data
US 2019/0143583 A1    May 16, 2019

(30) Foreign Application Priority Data
May 9, 2016   (IT) ............ UA2016A003274

(51) Int. Cl.
B29C 64/124   (2017.01)
B22F 7/08     (2006.01)
B33Y 80/00    (2015.01)
B33Y 10/00    (2015.01)
B29C 64/153   (2017.01)
B29C 64/314   (2017.01)
(Continued)

(52) U.S. Cl.
CPC ............ B29C 64/124 (2017.08); B22F 7/08 (2013.01); B22F 10/00 (2021.01); B29C 64/106 (2017.08); B29C 64/153 (2017.08); B29C 64/314 (2017.08); B33Y 10/00 (2014.12); B33Y 80/00 (2014.12); B29L 2031/005 (2013.01); Y02P 10/25 (2015.11)

(58) Field of Classification Search
None
See application file for complete search history.

(56) References Cited

U.S. PATENT DOCUMENTS 5,216,616 A * 6/1993 Masters ............... B29C 35/08
                                               264/401
2009/0124731 A1* 5/2009 Mizutani ............. C09D 11/36
                                                 524/86
(Continued)

FOREIGN PATENT DOCUMENTS

WO  WO 2016/064489       4/2016
WO  WO-2016-064489 A1 *  4/2016

OTHER PUBLICATIONS

International Search Report and the Written Opinion dated Sep. 21, 2017 From the International Searching Authority Re. Application No. PCT/IB2017/052698. (17 Pages).

Primary Examiner — Matthew J Daniels
Assistant Examiner — Mohammad M Ameen

(57) ABSTRACT

The process for the realization of a window/door framework (1) for walls of building comprises a molding step of a perimeter frame (2) by means of a three-dimensional molding device (5, 6, 7, 9), wherein the perimeter frame (2) comprises a plurality of perimeter sides made in a single monolithic body.

8 Claims, 6 Drawing Sheets

(51) Int. Cl.
 *B29C 64/106* (2017.01)
 *B22F 10/00* (2021.01)
 *B29L 31/00* (2006.01)

(56) References Cited

U.S. PATENT DOCUMENTS

2009/0271323 A1 10/2009 Zinniel et al.
2010/0251643 A1* 10/2010 Rosende .................. E06B 1/62
 52/204.2

* cited by examiner

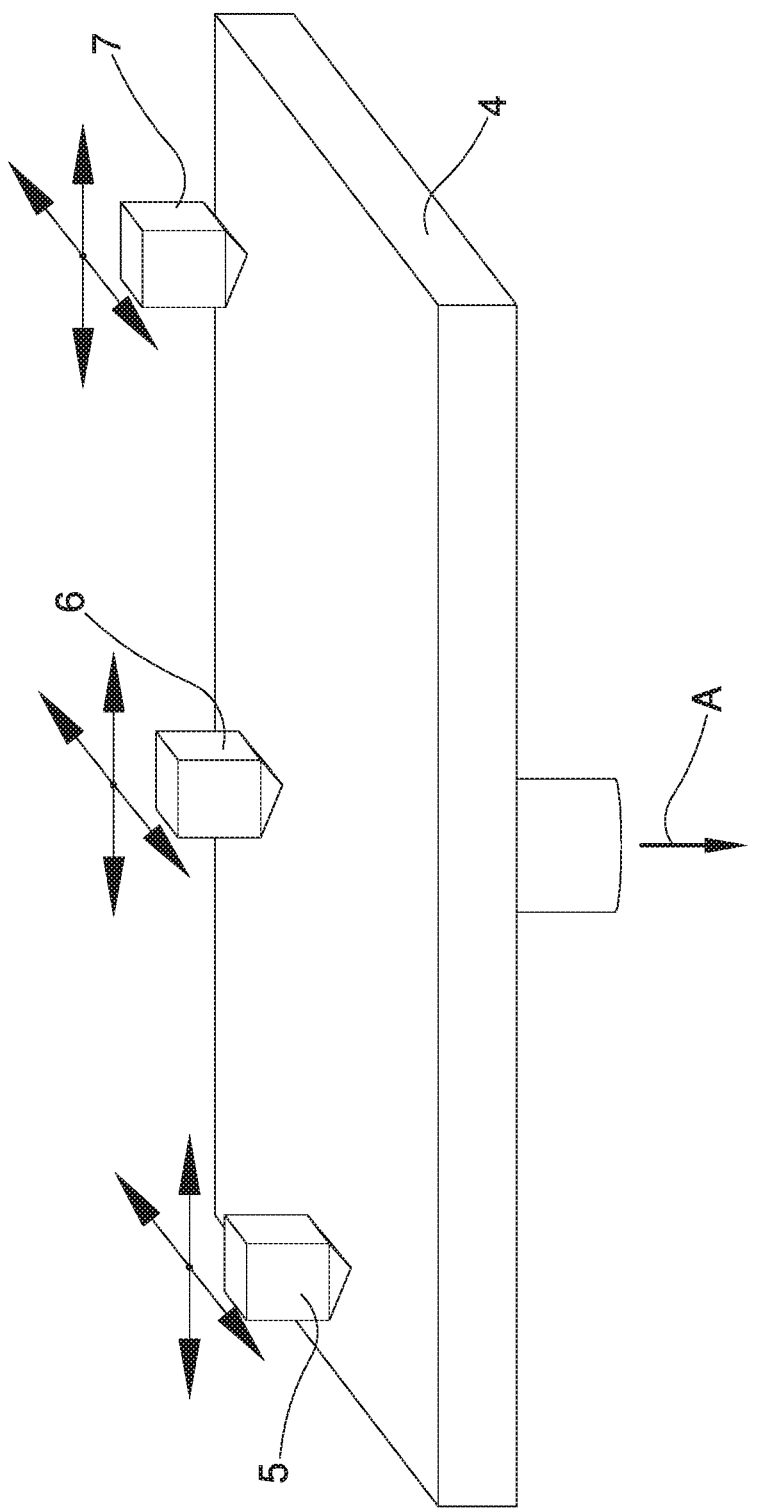

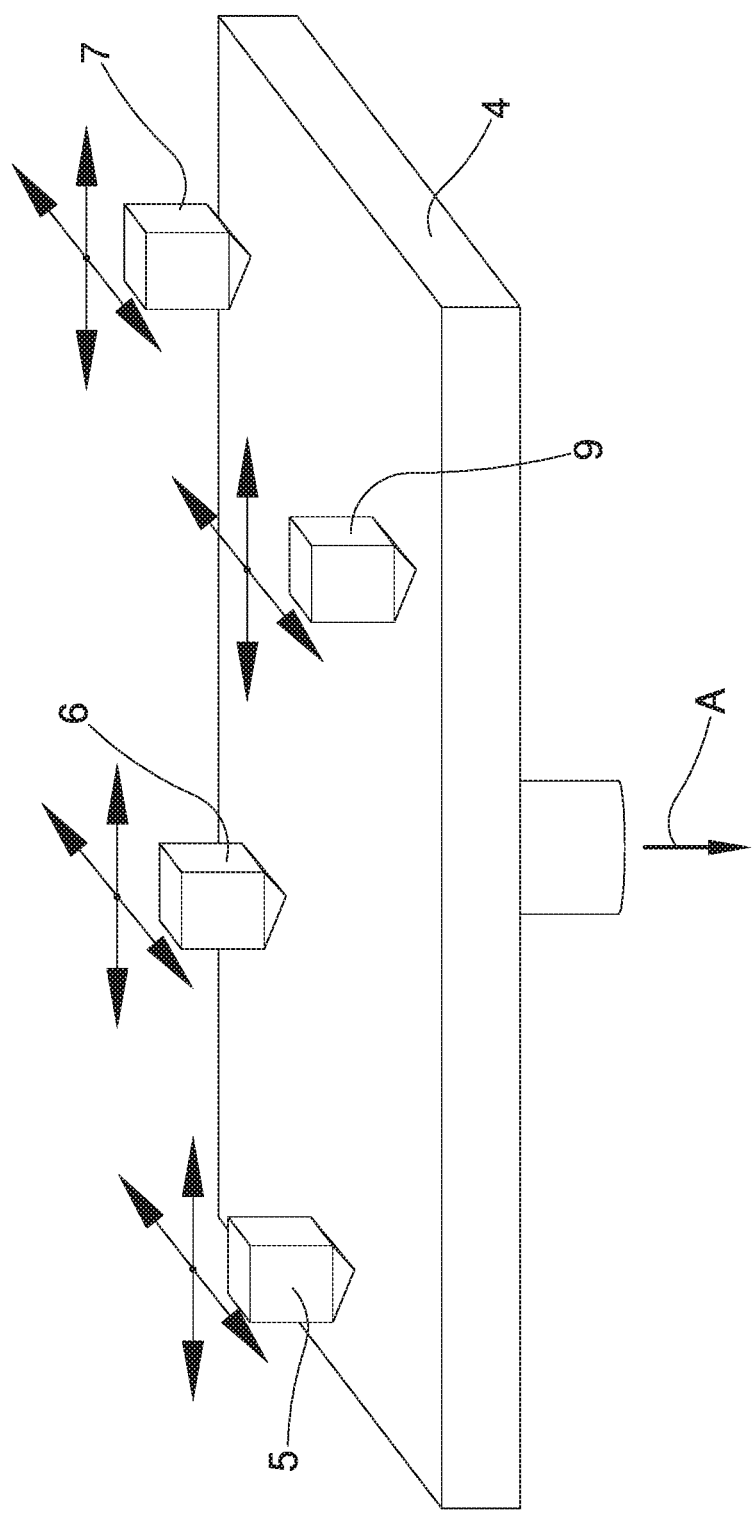

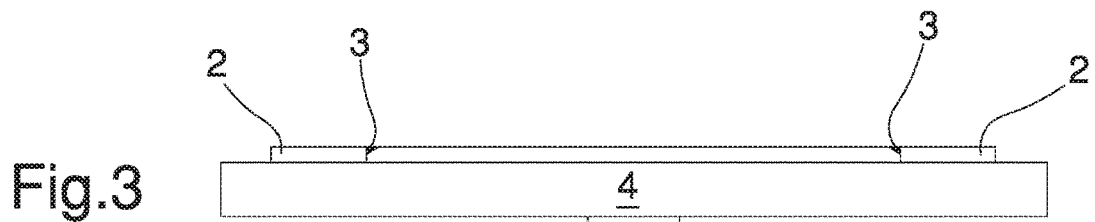
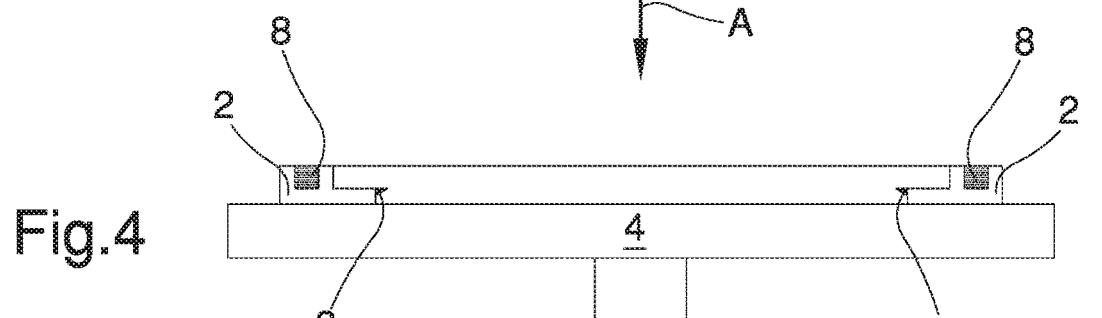
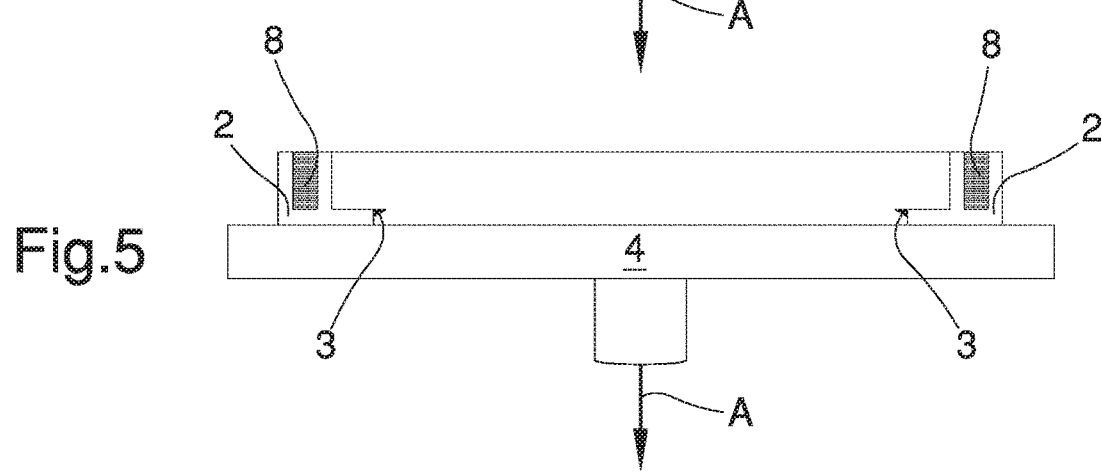
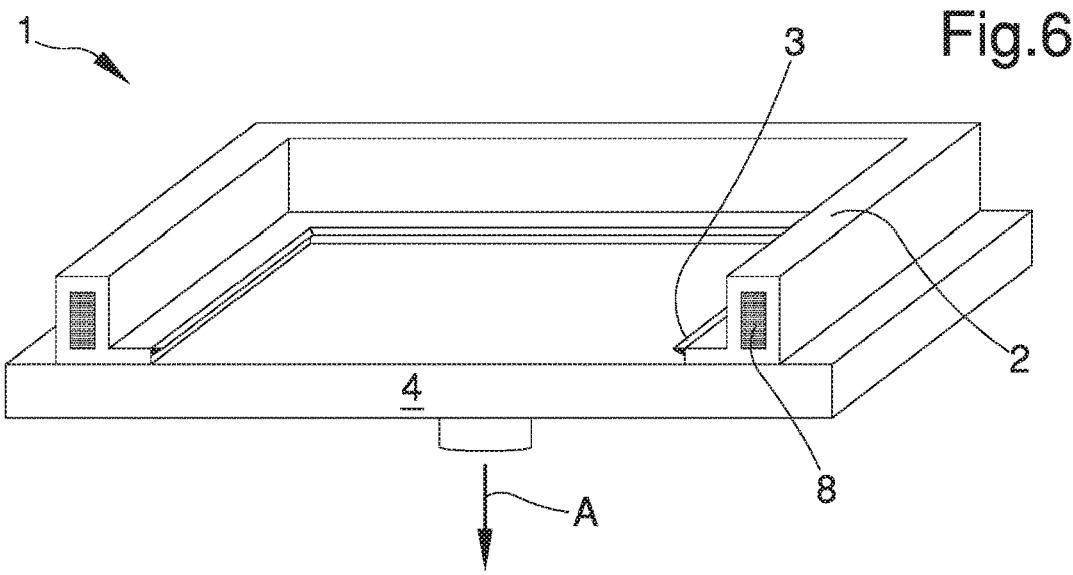

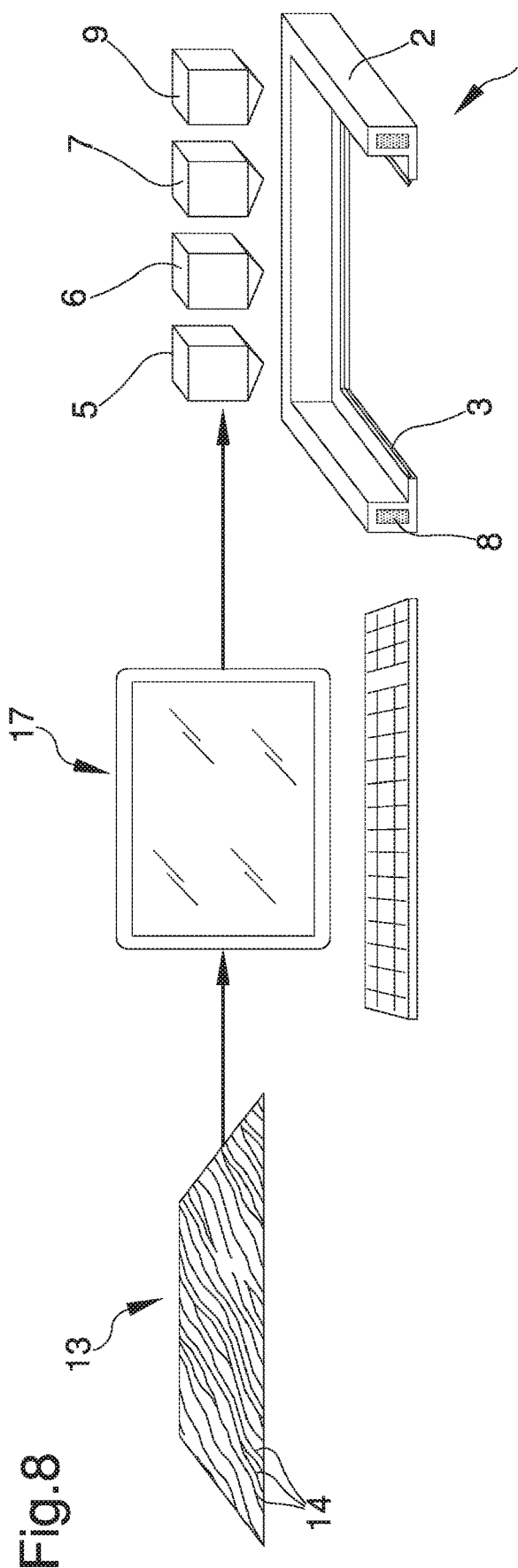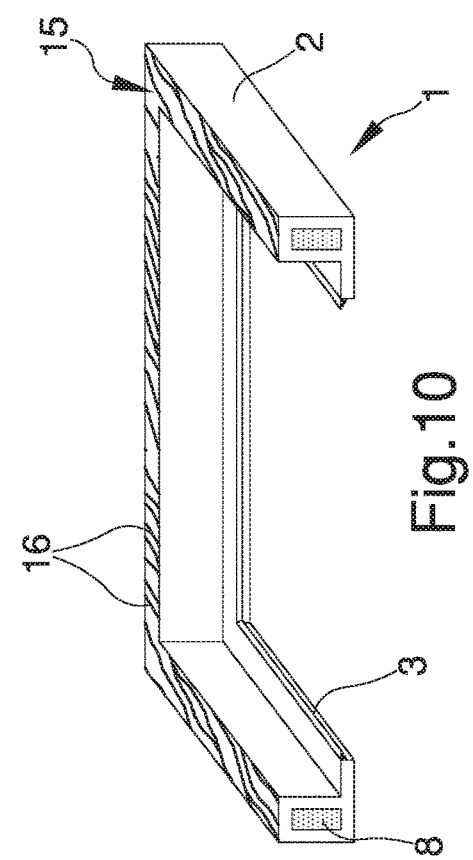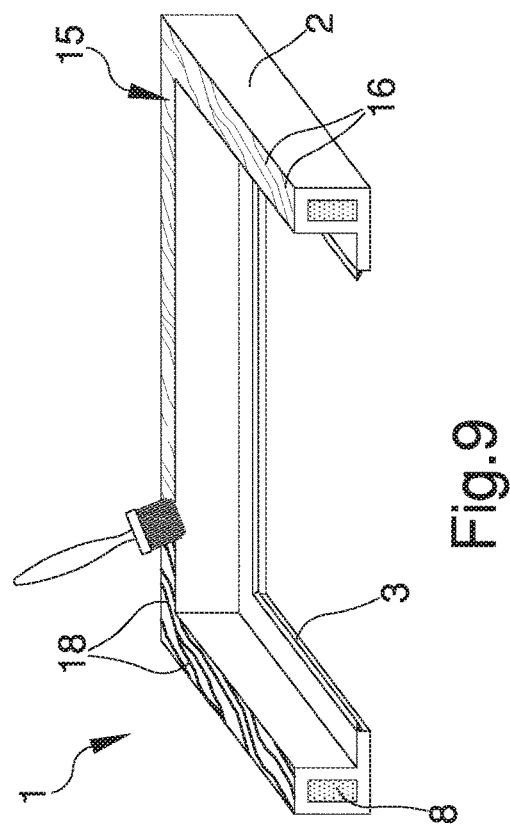

PROCESS FOR THE REALIZATION OF A WINDOW/DOOR FRAMEWORK FOR WALLS OF BUILDINGS

RELATED APPLICATIONS

This application is a National Phase of PCT Patent Application No. PCT/IB2017/052698 having International filing date of May 9, 2017, which claims the benefit of priority of Italian Patent Application No. UA2016A003274 filed on May 9, 2016. The contents of the above applications are all incorporated by reference as if fully set forth herein in their entirety.

FIELD AND BACKGROUND OF THE INVENTION

The present invention relates to a process for the realization of a window/door framework for walls of buildings.

Within the ambit of the present discussion by window/door framework is meant a structure intended to close an opening (window, door, flap etc.) made in an outer or inner wall, in the floor or in the roof of a building.

The structure can be either movable (e.g. the leaf of a window) or fixed (e.g. permanently secured to the wall).

The window/door frameworks usually consist in an outer frame, made of materials such as aluminum, plastic or the like, and in an inner panel, made of glass, Plexiglas or other material (either transparent or non-transparent).

With specific reference to the field of window/door frameworks with frames made of plastic, it is emphasized that the processes for the realization of these frames generally comprise the sealing of a plurality of corresponding profiled elements together, preferably made of PVC or other heat-sealable plastic materials.

The profiled elements have a particular multi-chamber structure inside the profiled elements themselves which allows ensuring a high degree of thermal insulation.

The plastic profiled elements so made have the main drawback related to the low resistance due to stresses and movements applied by externally exerted forces.

With reference to this drawback, prolonged exposure to sunlight causes, for example, heating of the plastic profiled elements due to the transmission of heat by irradiation with a consequent increase in the risk of deformations of the profiled elements themselves.

To obviate this drawback it is known to use reinforcing elements introduced in the containment seats defined in the profiled elements, and which extend along the entire extension of the profiled elements themselves, in order to give greater stability and reinforcement to the structure of the profiled elements themselves. Generally, such reinforcing elements are of the type of metal bars that are hardly deformable by applied stresses and which are inserted in the containment seat.

To insert the metal bars inside the containment seat of each profiled element, they must have a cross section with smaller overall dimensions than the cross section of the containment seats themselves.

Such metal bars can be movable inside the containment seats and need to be blocked to the structure of the profiled elements by means of suitable fixing machinery.

It also follows that these profiled elements have an increase in thermal conductivity and a related reduction in thermal insulation that the window/door framework made of plastic material provides between the interiors and the external environment.

After the assembly step of the metal bars inside the containment seats, the sealing operation of the profiled elements takes place through the melting of the respective head surfaces obtained by heating the portions to be connected by means of suitable electric resistance plates, and then pressing the heated portions one against the other until their mutual union.

Generally, the heated portions are the head extremities of the profiled elements, suitably cut at 45° to define, e.g., a right-angled portion of the frame.

At the line of union of the head surfaces of the profiled elements (surfaces cut at) 45°, the exceeding portion of molten material comes out and forms a bead protruding from the surface in view of the profiled elements.

For this reason, in order to give the finished window/door framework an appreciable aesthetic appearance, once sealed, the profiled elements undergo a sealing bead removal machining operation.

Generally, prior to the profiled element sealing step, the fixing of seal elements takes place, e.g. of the type of rubber sheaths, to the surfaces of the profiled elements that, in an assembly configuration, are facing to the glass inner panel. These known types of processes for the realization of window/door frameworks do have some drawbacks.

The main drawback is linked to the assembly operations of the profiled elements by sealing the head surfaces of the profiled elements to each other and the fixing of the reinforcing metal bars inside the respective containment seats which are particularly difficult and impractical for the assigned operator.

It follows that the assembly operations require long execution times and particularly complex and bulky machines with consequent reductions in the output production and high retail prices.

Another drawback is linked to the fact that the extrusion operations of the plastic profiled elements for obtaining the desired special multi-chamber structure are complex and require long production times.

Another drawback is related to the assembly operations of the seal elements to the surfaces of the profiled elements facing to the glass panel portions that are scarcely practical and safe since, during the glass inner panel assembly operations, such seal elements may be accidentally damaged or removed.

Another drawback relates to the fact that PVC window/door frameworks made using traditional processes are not particularly attractive from the aesthetic point of view.

Sometimes, therefore the window/door frameworks are made with a surface finish reproducing a material effect, in particular the wood effect, so that they are more pleasing to the sight.

The decoration of the window/door frameworks for obtaining the material effect can be accomplished by means of various techniques, such as the pigment sublimation, which consists in molding the motif simulating the wood grains on a flat surface on a special support and then transferring it by means of a hot process onto the surface to be decorated which has been appropriately pretreated so as to be perfectly receptive.

It is a decal in which the transfer of the decoration takes place at high temperatures and with suitable depressions, through which the solid pigment turns directly into vapor and penetrates simultaneously into the pre-treated surface of the window/door frameworks.

An alternative method commonly used for obtaining the material effect is the direct powder deposition, by means of which the polyester powders of different colors in the solid state are directly incorporated in the pre-treatment layer of the window/door framework.

These are however very complex and expensive methods that do not allow for obtaining a realistic material effect.

SUMMARY OF THE INVENTION

The main aim of the present invention is to provide a process for the realization of a framework for building walls which allows facilitating and making more practical the blocking operations of the metal bars to the profiled elements and the assembly operations of the profiled elements to each other, by simplifying and reducing the overall dimensions of the machinery used for such assembly steps.

One object of the present invention is to provide a process for the realization of a window/door framework for building walls that allows avoiding particularly difficult and complex extrusion processes for obtaining profiled elements of the outer surfaces and the geometry of the inner portions of the profiled elements according to the desired geometric characteristics and insulating properties.

Yet another object of the present invention is to provide a process for the realization of a window/door framework that allows reproducing the material effect in a simple manner thus obtaining a realistic effect.

Another object of the present invention is to provide a process for the realization of a window/door framework which allows overcoming the mentioned drawbacks of the prior art within the ambit of a simple, rational, easy, effective to use and low cost solution.

The above mentioned objects are achieved by the present process for the realization of a window/door framework having the characteristics of claim 1.

BRIEF DESCRIPTION OF THE SEVERAL VIEWS OF THE DRAWINGS

Other characteristics and advantages of the present invention will become more evident from the description of a preferred, but not exclusive, embodiment of a process for the realization of a window/door framework, illustrated by way of an indicative, but non-limiting, example in the accompanying drawings, wherein:

FIG. 1 is an axonometric view of a detail of the three-dimensional molding device used for the implementation of the process according to the invention;

FIG. 2 is an axonometric view of a detail of a further embodiment of the three-dimensional molding device used for the implementation of the process according to the invention;

FIGS. 3, 4, 5, 6, 7, 8 and 9 schematically illustrate the steps of the process for the realization of a window/door framework according to the invention;

FIG. 10 is an axonometric view of a detail of the window/door framework obtained by means of the process according to the invention;

DESCRIPTION OF SPECIFIC EMBODIMENTS OF THE INVENTION

Figure 7:
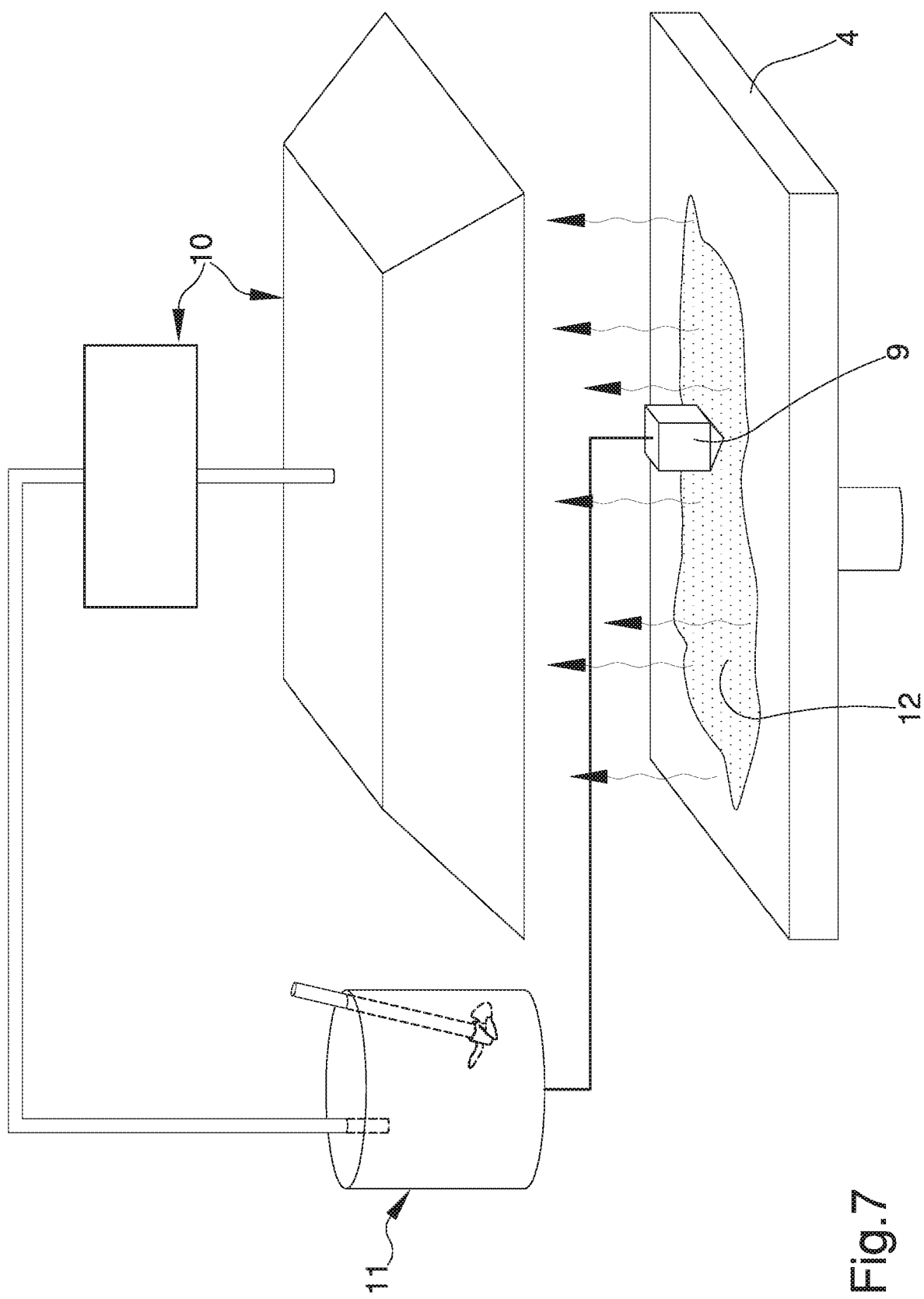
Figure 11:
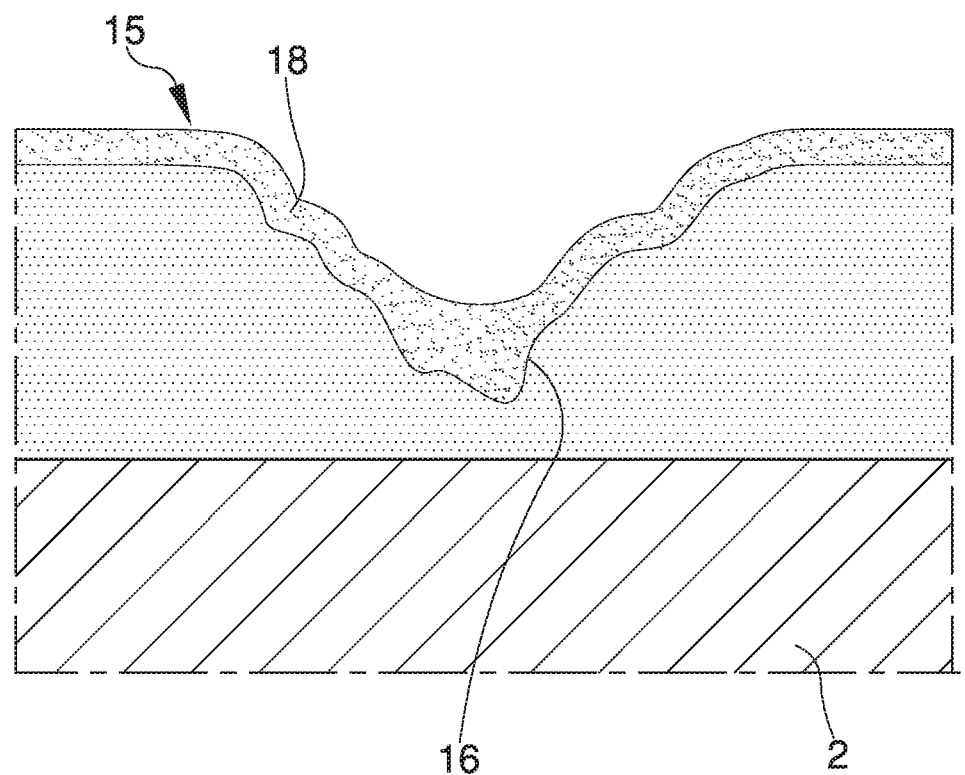
FIG. 11 is a sectional view of a detail of the window/door framework obtained by means of the process according to the invention.

With particular reference to such figures, reference numeral 1 generally designates a framework for building walls.

The window/door framework 1 comprises at least one perimeter frame 2 associable with at least one opening of a wall of a building.

Within the ambit of the present discussion, by the word "framework" is meant any structure of the type of a window, door or flap adapted to the closure of openings defined on the inner walls, on the outer perimeter walls or on floors and roofs of a building.

The perimeter frame 2 is made of, e.g., plastic material of the type of a resin, but other plastic materials cannot be ruled out, such as, of the heat-sealable type.

According to the invention, the perimeter frame 2 comprises a plurality of perimeter sides made in a single monolithic body.

For sake of completeness, the window/door framework 1 comprises an inner panel, not shown in the figures, associated with the perimeter frame 2.

The inner panel is advantageously made of glass (monolayer or multilayer), but its manufacturing in Plexiglas or other material, either of the transparent or non-transparent type, cannot be ruled out.

Preferably, the inner panel comprises a plurality of lateral faces arranged at 90° to each other and defining a substantially rectangular shape; but alternative embodiments cannot however be ruled out in which the inner panel has different conformations, e.g. triangle, pentagon, hexagon, and the like.

Depending on the conformation of the inner panel, the perimeter frame 2 has a number of perimeter sides coinciding with the number of lateral faces of the inner panel itself.

With particular reference to the embodiment shown in the figures, the perimeter frame 2 comprises two pairs of perimeter sides having a substantially elongated conformation and arranged orthogonal to each other, wherein each side of each pair is arranged substantially opposite and parallel to the other side.

Each perimeter side has a substantially L-shaped cross section and comprises an abutment surface which extends along the entire length of the perimeter side with which at least one portion of one of the lateral faces of the inner panel is associated in an assembly configuration.

Usefully, the window/door framework 1 comprises a seal element 3 made at each abutment surface and interposed, in the assembly configuration, between each abutment surface and a respective portion of the inner panel arranged at each lateral face.

Furthermore, the window/door framework 1 comprises a plurality of glazing bead elements, not shown in the illustrations, which are coupled to each perimeter side of the perimeter frame 2 for maintaining the inner panel in the assembly configuration.

It is however emphasized that the substantially L-shaped cross section of the perimeter sides is purely given as an example and alternative embodiments cannot be ruled out in which the cross section is substantially Z-shaped, S-shaped or with other shapes known to the person skilled in the art.

The process for the realization of the window/door framework 1 comprises a molding step of the perimeter frame 2 by means of a three-dimensional molding device 5, 6, 7, 9.

The three-dimensional molding device 5, 6, 7, 9 comprises at least one three-dimensional molding unit having deposition means of at least one of a liquid photopolymer material and a metal-based pulverulent material and solidification means of the materials themselves.

Within the ambit of the present discussion, by the expression "photopolymer material" is meant a polymeric material the characteristics of which change in the case of exposure to light radiation, within the visible or ultraviolet region of the electromagnetic spectrum.

In other words, the exposure of the photopolymer material to light radiation causes the photopolymer material itself becoming stiff.

In this case, the liquid photopolymer material is selected from resin and rubber. Depending on the type of material dispensed by the deposition means, the solidification means comprise at least one of a light emission unit adapted to the hardening of the liquid photopolymer material and a sintering unit of the metal-based pulverulent material.

More in detail, the light emission unit is of the type of an ultraviolet or visible radiation emission source of the electromagnetic spectrum.

The sintering unit carries out a heat treatment for the transformation of the pulverulent material into an indivisible material.

Preferably, the sintering unit carries out such heat treatment by means of a laser source that heats the pulverulent material by means of the aid of electromagnetic fields.

In the particular embodiment shown in the figures, the three-dimensional molding step comprises:
  a deposition step of at least one of the liquid photopolymer material and the metal-based pulverulent material on a deposition plane 4 by means of the deposition means. Preferably, the deposition plane 4 is arranged substantially horizontal and comprises a containment edging inside which the material is deposited;
  a solidification step of at least one of the liquid photopolymer material and the metal-based material by means of the light emitting unit and the sintering unit respectively, to obtain at least one layer of the perimeter frame 2. The solidification step is subsequent to the deposition step;
  a step of substantially vertical growth of each layer starting from the deposition plane 4.

Preferably, the molding step is carried out, e.g., by means of the Polyjet method. Within the ambit of the present discussion, by the technical word "Polyjet" is meant the process in which the deposition takes place of layers of liquid photopolymer material which hardens by means of the emission of ultraviolet radiation incident on them.

Once the deposition and solidification steps are performed of at least one of the liquid photopolymer material and the pulverulent material, the growth step will follow that consists in the execution of a plurality of deposition and solidification steps for obtaining a plurality of solid layers grown vertically one on top of the other from the deposition plane 4.

Usefully, between one growth step and the other, the deposition plane 4 is moved along a substantially vertical direction of movement A by a predefined pitch and corresponding to the thickness of the layer to grow.

In a preferred embodiment shown in the figures, the three-dimensional molding device 5, 6, 7, 9 comprises a first three-dimensional molding unit 5 having:
  first deposition means of a first liquid photopolymer material; and
  first solidification means comprising a first light emission unit adapted to the hardening of the first liquid photopolymer material deposited.

In this case, the first liquid photopolymer material comprises a resin and is used for the realization of the perimeter frame 2 of the window/door framework 1.

The first deposition means comprise a nozzle adapted to the dispensing of predefined doses of the first liquid photopolymer material; the first light emission unit is adapted to emit ultraviolet radiation incident onto the first liquid photopolymer material in order to obtain the hardening thereof and, consequently, the formation of a solid layer.

In the particular embodiment shown in the figures, the first three-dimensional molding unit 5 is movable along a plurality of directions on a two-dimensional Cartesian plane substantially parallel to the deposition plane 4 for the deposition and the realization of a plurality of plastic layers depending on the desired final conformation.

The deposition plane 4 is movable downwards along the direction of movement A by a pitch coinciding with the thickness of the plastic layer to be deposited. It cannot however be ruled out that the first three-dimensional molding unit 5 is movable along a plurality of directions in a three-dimensional Cartesian space and that the movement plane 4 remains in a fixed position.

The three-dimensional molding device 5, 6, 7, 9 comprises a second three-dimensional molding unit 6 having:
  second deposition means of a second liquid photopolymer material; and
  second solidification means comprising a second light emission unit adapted to the hardening of the second liquid photopolymer material deposited.

In particular, the second liquid photopolymer material comprises rubber and is used for the realization of the seal element 3 at each abutment surface of the perimeter sides of the perimeter frame 2.

Similarly to the first deposition means, also the second deposition means comprise a nozzle adapted to the dispensing of predefined doses of the second liquid photopolymer material; the second light emission unit is adapted to emit ultraviolet radiation incident onto the second liquid photopolymer material deposited in order to obtain the hardening thereof and, consequently, the formation of a solid layer.

In the particular embodiment shown in the figures, the second three-dimensional molding unit 6 is movable along a plurality of directions on a two-dimensional Cartesian plane substantially parallel to the deposition plane 4 for the deposition and the realization of a plurality of layers defining the seal element 3.

The deposition plane 4 is movable downwards along the direction of movement A by a pitch coinciding with the thickness of the rubber layer to be deposited. It cannot however be ruled out that the second three-dimensional molding unit 6 is movable along a plurality of directions in a three-dimensional Cartesian space and that the movement plane 4 remains in a fixed position.

In addition, the three-dimensional molding device 5, 6, 7, 9 comprises a third three-dimensional molding unit 7 having:
  third deposition means of the metal-based pulverulent material; and
  third solidification means comprising a sintering unit of the pulverulent material.

More particularly, the pulverulent material comprises substantially spherical particles made of metal material.

Specifically, the third deposition means comprise a nozzle for dispensing a plurality of doses of the pulverulent material; the sintering unit comprises a laser source adapted to sinter the particles of the pulverulent material in order to obtain a compacted metal layer.

In the particular embodiment shown in the figures, the third three-dimensional molding unit 7 is movable along a plurality of directions on a two-dimensional Cartesian plane substantially parallel to the deposition plane 4 for the deposition and realization of a plurality of layers of metal material.

The deposition plane 4 is movable downwards along the direction of movement A by a pitch coinciding with the thickness of the layer of metal material to be deposited.

It cannot however be ruled out that the third three-dimensional molding unit 7 is movable along a plurality of directions in a three-dimensional Cartesian space and that the movement plane 4 remains in a fixed position.

The third three-dimensional molding unit 7 is adapted to the realization of a metal reinforcing bar 8 housed in a hollow containment seat defined inside each perimeter side of the perimeter frame 2.

During the molding step, for the realization of the reinforcing bar 8 inside the perimeter frame 2, the deposition and solidification steps of the first liquid photopolymer material and of the pulverulent material are carried out in such a way as to obtain a plurality of layers wherein each layer comprises portions in which there is the first liquid photopolymer material and portions in which there is the metal-based pulverulent material.

Similarly, for the realization of the seal element 3 associated with the perimeter frame 2 the deposition and solidification steps of the first liquid photopolymer material and of the second liquid photopolymer material are carried out in such a way as to obtain a plurality of layers in which each layer comprises portions in which there is the first liquid photopolymer material and portions in which there is the second liquid photopolymer material.

It cannot however be ruled out that the molding step comprises a realization step of at least one opening/closing mechanism of the perimeter frame 2 with respect to the opening.

Within the ambit of the present discussion, by the expression "opening/closing mechanism" is meant the gear system, embedded inside the perimeter frame 2, and hinging elements, associated with one or more perimeter sides, which allow for the opening and closing of the window/door framework 1 with respect to the opening of the wall.

In other words, this opening/closing mechanism comprises handles, hinges and hooking means of the perimeter frame 2 to the frame coating the opening to be closed.

The realization step comprises a dispensing step of at least one of the liquid photopolymer material and the pulverulent material at at least one portion of a layer of the perimeter frame 2 and a hardening step of the dispensed material. Generally, the opening/closing mechanism, being made of metal material, is realized by means of the third three-dimensional molding unit 7.

It cannot be ruled out that, during the molding step, the deposition and solidification steps can exist simultaneously of the first liquid photopolymer material for the realization of the plastic perimeter frame 2, of the second liquid photopolymer material for the realization of the seal element 3, and of the pulverulent material for the realization of the reinforcing bar 8 and of the opening/closing mechanism.

Advantageously, the three-dimensional molding step comprises:
- at least a supplying step of PVC and of at least a solvent in which PVC is soluble;
- at least a mixing step of PVC and of the solvent to obtain at least a mixture in the liquid phase;
- at least a distribution step of the mixture on a deposition plane 4; and
- at least an evaporation step of the solvent from the mixture to obtain at least a layer of PVC 12 of the perimeter frame 2, which is subsequent to the distribution step.

The three-dimensional molding step also comprises the repetition of the distribution step and of the evaporation step to obtain a plurality of overlapped layers of PVC 12 conforming the perimeter frame 2.

Usefully, the three-dimensional molding device 5, 6, 7, 9 comprises at least a distribution set 9 of the mixture provided with:
- at least a mixture distribution head; and
- at least a removal and recovery system 10 of the evaporated solvent.

Furthermore, the distribution set 9 comprises at least a mixing unit 11 of PVC in the pellets form and of the solvent.

Preferably, the distribution head is movable along a plurality of directions on a two-dimensional Cartesian plane substantially parallel to the deposition plane 4 for the distribution of the mixture to obtain a plurality of layers of PVC 12 based on the final desired conformation.

In the particular embodiment shown in the figures, the distribution set 9 operates synergistically with the first three-dimensional molding unit 5, the second three-dimensional molding unit 6, and the third three-dimensional molding unit 7, although embodiments cannot be ruled out in which this distribution set 9 is used in an independent manner, e.g. exclusively, i.e. without the intervention of the first three-dimensional molding unit 5, the second three-dimensional molding unit 6, and the third three-dimensional molding unit 7, to obtain a window/door framework 1 entirely made of PVC.

PVC, or polyvinylchloride, is a thermoplastic polymer with high resistance and high elasticity, as well as resistant to the contact with acids, alkaline solutions and saline solutions, both diluted and concentrated, lightweight, strong, insulating and having poor gas permeability.

During PVC production, depending on the intended use and the material characteristics required, additives are added to PVC, therefore by varying the type and the amount of such additives, it is possible to obtain a material with totally different characteristics.

In particular, typical additives that are added to PVC during production are stabilizers to protect it from thermal degradation and enhance light and weather resistance, plasticizers to give flexibility and elasticity to the product, lubricants to facilitate processing, coloring pigments, etc.

Usefully, the solvent used to produce the mixture is at least one of a ketone and an ether.

In fact, despite the fact that PVC is a rather inert material, it is soluble in some organic solvents, including ketones and ethers, which, on the one hand, perform a physical softening action of the polymer pellets and, on the other hand, a chemical action on the Van der Walls links existing between the macromolecules, bringing them into solution.

Preferably, the solvent is at least one of a cyclic ketone and a cyclic ether, particularly cyclohexanone and tetrahydrofuran, which can be used individually or in combination with each other and which are solvents particularly suitable to dissolve PVC, although the use of solvents of a different type cannot be ruled out.

It cannot also be ruled out the possibility of adding at least one reinforcing material to the mixture, which is added to PVC and to the solvent during the mixing step so as to make the layer of PVC 12 more resistant and to increase its mechanical properties.

Alternatively, an auxiliary head can be provided which only allows the deposition of the reinforcing material.

Preferably, the reinforcing material is in the form of a fiber, although the possibility of using materials in a different form cannot be ruled out.

An example of a material in the form of a fiber to use are glass fibers, although fibers of a different type may be used.

Such a solution could be particularly advantageous in the event of a window/door framework 1 being made with no reinforcing bar 8 inside it.

In this case it is possible to make an inner geometry of the window/door framework 1 of a different type, e.g. a honeycomb geometry which, together with the presence of the reinforcing material, allows increasing the mechanical properties of the window/door framework 1, in particular its mechanical strength.

The mixture obtained in the mixing step of PVC and of at least one of the solvents is a mixture in the liquid phase, which can therefore be distributed on the deposition plane 4 in a simple manner.

Since this mixture is distributed by means of the distribution head, its viscosity must be equal to a preset value such as to allow a simple distribution on the deposition plane 4, even if a distribution head having a different shape is used. In particular, since PVC may have different characteristics based on the variation of the additives contained therein, the percentage by weight of solvent with respect to PVC can be changed from time to time as the polymer load changes, so that the viscosity of the mixture is maintained equal to the preset value.

It cannot however be ruled out the possibility of equipping the distribution set 9 with a solvent dosing system from time to time, depending on the type of PVC used and of the additives contained therein.

The evaporation step of the solvent occurs substantially immediately after the distribution step of the mixture.

The evaporation step of the solvent can also occur in a natural or forced manner. In particular, in the case of the forced evaporation of the solvent it is possible to provide an evaporator device associated with the distribution set 9, e.g. a hot air blower, an infrared lamp or another heating element, which allows accelerating the evaporation step of the solvent so that it takes place immediately after the deposition step.

In fact, as soon as the mixture is distributed on the deposition plane 4, the solvent evaporates immediately due to its high volatility, thus enabling to obtain the layer of PVC 12 without the need for further solidification steps of the distributed material.

The solvent used to produce the mixture is toxic and easily flammable.

In particular, tetrahydrofuran forms highly explosive mixtures with air, is highly toxic to oral contact and is highly irritating to dermal and respiratory contact. As for cyclohexanone, this is a substance that also forms explosive mixtures with air, is corrosive and highly toxic, since it causes convulsions, hypothermia and bradycardia.

In both cases, these are also highly harmful substances for the environment.

For these reasons, the three-dimensional molding device 5, 6, 7, 9 is housed inside a controlled atmosphere cabinet, which prevents the dispersion of toxic vapors of the evaporated solvent during the processing steps and so as to preserve the operators from any possible intoxication.

The evaporated solvent is therefore recovered by means of the removal and recovery system 10, which suctions the air present in the cabinet and recovers the evaporated solvent, sending it again to the mixing unit 11 so as to avoid the continuous supply of a new solvent and optimizing production costs.

Advantageously, the process also comprises at least one definition step of the surface shape of the perimeter frame 2 comprising:
- at least one supplying step of at least an image 13 in a digital format reproducing at least a wooden surface portion provided with a plurality of grains 14 comprising a plurality of pixels;
- at least one identification step of at least one color shade datum of each pixel by means of at least one software; and
- at least one transformation step of the color shade datum into at least one depth spatial datum to produce at least a three-dimensional digital mold of the perimeter frame 2 with material effect provided with at least an outer surface 15 reproducing the grains 14 by means of a plurality of grooves 16 with variable depth.

Within the ambit of this discussion, by "color shade" is meant the color intensity of each pixel of the image 13, with reference to any possible color, including black and white.

As a result, the software used allows identifying the color shade datum for any image 13 in a digital format either colored, black and white or in the gray range. In particular, the depth of the grooves 16 on the outer surface 15 is substantially proportionate to the color shade of the grains 14.

The software used by means of a processing unit 17 therefore allows producing a three-dimensional digital mold provided with grooves 16 being as deep as is the intensity of the color shade of the pixels relative to the single grain 14.

This way, the surface finish of the perimeter frame 2 is such as to reproduce the material effect from both the tactile and visual point of view.

The molding step allows making the three-dimensional digital mold to obtain the perimeter frame 2 with material effect by means of the three-dimensional molding device 5, 6, 7, 9.

In other words, it is possible to make the mold by means of at least one of the three-dimensional molding methods described above.

In particular, in the event of the perimeter frame 2 being made by means of the distribution of the PVC and solvent mixture to form the layer of PVC 12, it is also useful to realize the definition step of the surface shape by means of the distribution of the mixture.

In fact, the solvent contained in the distributed mixture for the mold realization causes the PVC of which the perimeter frame 2 is made to undergo a surface softening.

Such softening action allows improving the adhesion to the perimeter frame 2 of the layers of PVC 12 forming the mold, so that the perimeter frame itself is made in a single block.

Usefully, the process comprises at least one painting step of the outer surface 15 by means of at least one paint 18.

In particular, the paint 18 used may be in the liquid and/or powder form.

Such paint 18 accumulates within the grooves 16 and reproduces the color shades of the grains 14.

This way it is possible to define the superficial shape of the perimeter frame 2 by recreating a realistic material effect not only from the point of view of the surface finish, but also from the color point of view, since the paint 18 accumulating in the grooves 16 permits recreating the chiaroscuro effect which is typical of the grains 14 of the wood.

At the end of the molding step, the window/door framework 1 is obtained in which the perimeter frame 2, the reinforcing bar 8 and the seal element 3 are made in a single monolithic body.

It has in practice been observed that the described invention achieves the intended objects and in particular the fact is emphasized that the window/door framework thus made allows avoiding the necessary operations for the assembly of the window/door framework, the insertion of the reinforcing bar and the relative fixing to the perimeter frame since it is made in a single monolithic body by means of the process described above.

It follows therefore that the machinery used for the realization of these window/door frameworks has significantly smaller overall dimensions and exclusively related to the formats of the frameworks one wishes to make.

Moreover, this realization process allows avoiding additional operations in the event of the framework obtained at the end of the assembly steps having irregularities or imperfections of the profiled element due to material in excess. The process for the realization of the window/door framework also allows avoiding particularly difficult and complex extrusion processes for obtaining profiled elements of the outer surfaces and the desired geometry of the inner portions of the perimeter frame, thus simplifying the operations required for its realization and reducing the execution times thereof.

Furthermore, the particular solution of providing the PVC and solvent mixture to obtain a liquid mixture allows realizing a PVC window/door framework, thus avoiding various solidification steps.

Furthermore, the particular solution of providing a definition step of the surface shape of the perimeter frame and a subsequent painting step makes it possible to obtain the material effect in a realistic manner without the use of decorative techniques such as decalcomania, etc.

What is claim is:

1. Process for the realization of a window/door framework (1) for building walls, wherein said process comprises at least one molding step of a perimeter frame (2) by means of at least one three-dimensional molding device (5, 6, 7, 9), said perimeter frame (2) comprising a plurality of perimeter sides made in a single monolithic body, wherein said three-dimensional molding step comprises:
   at least a supplying step of PVC and of at least one solvent in which said PVC is soluble;
   at least a mixing step of said PVC and of said solvent to obtain at least a mixture in the liquid phase;
   at least a distribution step of said mixture on a deposition plane (4);
   at least an evaporation step of said solvent from said mixture to obtain at least a layer of PVC (12) of said perimeter frame (2), said evaporation step being subsequent to said distribution step; and
   repeating said distribution step and said evaporation step to obtain a plurality of said overlapped layers of PVC (12) conforming said perimeter frame (2); and
   wherein said three-dimensional molding device (5, 6, 7, 9) comprises at least a distribution set (9) of said mixture provided with:
   at least a distribution head of said mixture;
   at least a removal and recovery system (10) of said evaporated solvent; and
   at least a mixing unit (11) of said PVC and of said solvent.

2. Process according to claim 1, wherein said solvent is at least one of a ketone and an ether.

3. Process according to claim 1, wherein said solvent is at least one of a cyclic ketone and a cyclic ether.

4. Process according to claim 1, wherein said solvent is at least one of a cyclohexanone and a tetrahydrofuran.

5. Process according to claim 1, wherein said mixture comprises said solvent in a percentage by weight with respect to said PVC so that the viscosity of said mixture is equal to a preset value.

6. Process according to claim 1, wherein said process comprises at least a definition step of the surface shape of said perimeter frame (2) comprising:
   at least one supplying step of at least an image (13) in a digital format reproducing at least a wooden surface portion provided with a plurality of grains (14), comprising a plurality of pixels;
   at least one identification step of at least one color shade datum of each of said pixels by means of at least one software; and
   at least one transformation step of said color shade datum into at least one depth spatial datum to produce at least a three-dimensional digital mold of said perimeter frame (2) with material effect provided with at least an outer surface (15) reproducing said grains (14) by means of a plurality of grooves (16) with variable depth;
   said molding step making said mold to obtain said perimeter frame (2) with material effect by means of said three-dimensional molding device (5, 6, 7, 9).

7. Process according to claim 6, wherein said process comprises at least one painting step of said outer surface (15) by means of at least one paint (18), said paint (18) accumulating in said grooves (16) and reproducing said color shades of said grains (14).

8. Process according to claim 6, wherein the depth of said grooves (16) is substantially proportionate to said color shade of said grains (14).

* * * * *